United States Patent [19]
Fukuda et al.

[11] Patent Number: 4,665,532
[45] Date of Patent: May 12, 1987

[54] RADIO COMMUNICATION SYSTEM

[75] Inventors: Eisuke Fukuda, Yokohama; Yukio Takeda, Zama; Yoshimasa Daido, Yokohama; Hiroshi Nakamura, Sagamihara; Susumu Sasaki, Fujisawa; Sadao Takenaka, Yokohama, all of Japan

[73] Assignee: Fujitsu Limited, Kawasaki, Japan

[21] Appl. No.: 693,341

[22] Filed: Jan. 22, 1985

Related U.S. Application Data

[63] Continuation-in-part of Ser. No. 674,830, Nov. 26, 1984, abandoned.

[30] Foreign Application Priority Data

Nov. 30, 1983 [JP] Japan ............................... 58-225637
Jan. 19, 1984 [JP] Japan ............................... 59-007454

[51] Int. Cl.⁴ ........................ H04L 25/34; H04B 7/00
[52] U.S. Cl. ........................................ 375/19; 375/39; 371/55; 455/60
[58] Field of Search ..................... 375/17, 19, 20, 25, 375/26, 34, 39, 58, 118, 119; 371/43, 46, 55, 56; 340/347 DD; 370/110, 111; 455/46, 60

[56] References Cited

U.S. PATENT DOCUMENTS

| | | | |
|---|---|---|---|
| 2,957,947 | 10/1960 | Bowers | 375/34 |
| 3,311,442 | 3/1967 | De Jager et al. | 455/60 |
| 3,343,093 | 9/1967 | Van Gerwen | 375/39 |
| 3,344,352 | 9/1967 | Daguet | 455/60 |
| 3,349,177 | 10/1967 | Cattermole | 375/25 |
| 3,378,771 | 4/1968 | Van Gerwen et al. | 455/60 |
| 3,955,141 | 5/1976 | Lyon et al. | 375/39 |
| 4,408,189 | 10/1983 | Betts et al. | 375/19 |
| 4,519,073 | 5/1985 | Bertocci et al. | 370/111 |
| 4,528,550 | 7/1985 | Graves et al. | 375/19 |

Primary Examiner—Benedict V. Safourek
Attorney, Agent, or Firm—Staas & Halsey

[57] ABSTRACT

A radio communication system using a QAM system. In the transmission system, the data of each channel to be transmitted is divided into data groups having frame slots. When the polarity of the mean value of a data summed in a present data group is the same as the polarity of the mean value of the deviation of all data group coming before, all data in the present data group is inverted, a direct current component and a lower frequency component near the direct current component are suppressed, and carrier waves are injected after encoding. In the receiving system, a decoder decodes a received signal to obtain the original data before the encoding by the transmission system.

7 Claims, 21 Drawing Figures

| Fig. 8A | Fig. 8B |

Fig. 15
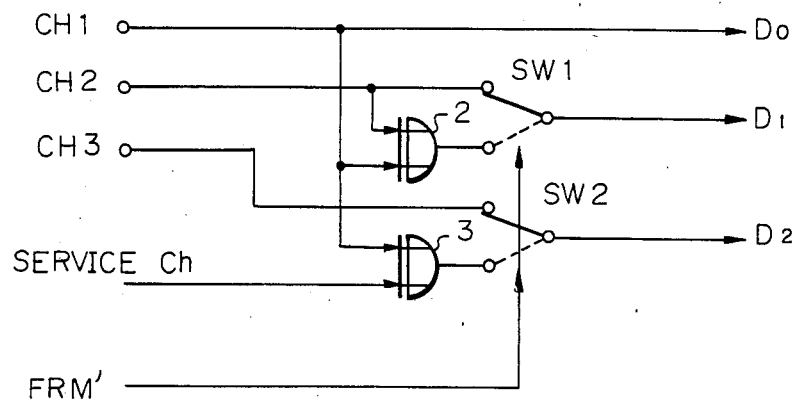
Fig. 16
| CH 1 | CH 2 | SERVICE CH | Do | D1 | D2 |
|---|---|---|---|---|---|
| 1 | 0 | 1 | 1 | 1 | 1 |
| 1 | 0 | 0 | 1 | 1 | 0 |
| 0 | 0 | 1 | 0 | 0 | 0 |
| 0 | 0 | 0 | 0 | 0 | 1 |
Fig. 17
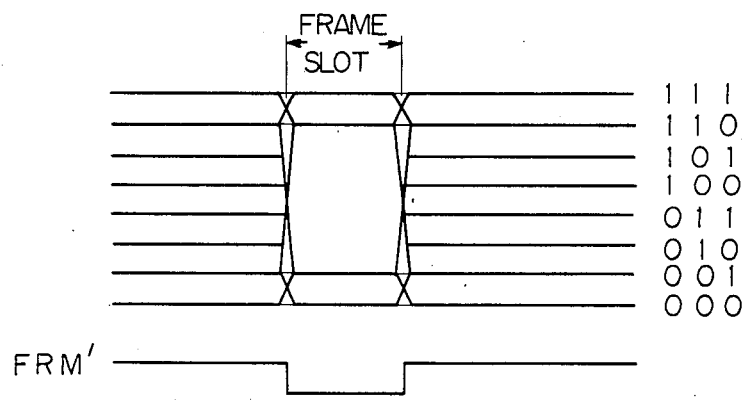

| D₀ | D₁ | D₂ | | CH1 | CH2 | SERVICE CH |
|---|---|---|---|---|---|---|
| 1 | 1 | 1 | | 1 | 0 | 1 |
| 1 | 1 | 0 | | 1 | 0 | 0 |
| 0 | 0 | 1 | | 0 | 0 | 0 |
| 0 | 0 | 0 | | 0 | 0 | 1 |

4,665,532

RADIO COMMUNICATION SYSTEM

CROSS REFERENCES TO RELATED APPLICATIONS

This application is a continuation-in-part of U.S. application Ser. No. 674,830, now abandoned, filed Nov. 26, 1984, and is related to U.S. Pat. No. 4,581,748, filed Dec. 28, 1983, both assigned to the assignee of the present application.

BACKGROUND OF THE INVENTION

1. Field of the Invention

The present invention relates to a radio communication system, more specifically to a radio communication system of a multistate quadrature amplitude modulation (QAM) type.

2. Description of the Prior Art

In a radio communication system, data is sent from a transmission system over a digitally modulated carrier wave to a receiving system, where the carrier wave is demodulated and the data is regenerated. Various systems are used for the digital modulation.

One of these is the multistate QAM system. In a QAM type radio communication system, both a phase component and an amplitude component of the carrier wave are modulated. Many modulation points corresponding to the data are arranged on one plane. Therefore, a great amount of data can be transmitted and transmission capacity can be considerably increased.

The number of modulation points formed (states) in the QAM system can be selected from such numbers as 4, 16, 32, 64, 128, etc. In the case where a high number of modulation points are used, it is important that a standard carrier wave be regenerated for synchronous detection during demodulation of the original data.

The most often used multistate QAM system is the 16-state QAM system. The regeneration circuit for the standard carrier wave in this case is conventionally either a selective control type, which extracts a necessary component with the phase of the carrier wave from the modulated signal, or a reverse modulation circuit, which produces a regenerated carrier wave by further modulating the modulated data and multiplying it with the received wave. However, in the former, when the error rate is high, a carrier wave having a good signal-to-noise (S/N) ratio cannot be obtained and, in the latter, the circuit construction becomes complex. In both cases, the greater the number of modulation points (states), the worse the S/N ratio. Further, a ziehen phase of the carrier wave becomes indefinite, so that a differential coding and decoding logic process must be used.

There has been proposed in Japanese Patent Application Nos. 57-231635, 57-231636, and 57-231634, filed on Dec. 29, 1982, and corresponding U.S. application Ser. No. 566,401; a method by which frequency components near the carrier wave are removed by filters from the spectrum of the transmission side and the pilot signal is further superposed onto the carrier wave in the transmission side, and regenerates the carrier wave in the receiving side. In this method, however, regeneration of the removed spectrum in the receiving side is difficult.

In a multistate QAM system which previously suppresses the low-frequency component of the transmission spectrum when generating the carrier wave, the carrier wave is frequency-modulated by a service channel signal, that is, a composite modulation system is used. In this system, however, a carrier wave having a good quality cannot be obtained and the error rate of the data becomes higher.

SUMMARY OF THE INVENTION

An object of the present invention is to provide a radio communication system which regenerates a carrier wave with a good S/N ratio regardless of the error rate and which can obtain an absolute phase so that a differential coding and decoding logic process is not necessary.

Another object of the present invention is to provide a radio communication system which does not result in a higher error rate in the signal. A further object of the present invention is to provide a radio communication system, which enables insertion of a service channel signal into a time slot without raising the error rate.

In view of the above objects, there is provided a transmission system in which the data of each channel to be transmitted is divided into data groups having frame slots. When the polarity of the mean value of the data in a data group is the same as the polarity of the mean value of the deviation of all prior data groups, all data in the present data group is inverted, a direct current component and a lower frequency component near the direct current component are suppressed, and carrier waves are entered after encoding. In a receiving side, a decoder operates to obtain the original data before encoding on the transmission side according to the inversion flag signals inserted in the frame slots in the transmission side.

Further, according to the present invention, a service channel is inserted into the frame slot together with an inversion/non-inversion signal in such a manner that the service channel is placed at a maximum or minimum level side of the data.

BRIEF DESCRIPTION OF THE DRAWINGS

FIG. 15 is a detailed circuit diagram of a multiplex portion of the service channel insertion circuit 1 shown in FIG. 14;

FIG. 16 is a diagram showing a code conversion performed in the circuit shown in FIG. 15;

FIG. 17 is a diagram showing signal levels at which the inversion/non-inversion signal and the service channel signal are positioned;

DESCRIPTION OF THE PREFERRED EMBODIMENTS

Below, an embodiment of a radio communication system of the QAM type based on the present invention will be explained.

Figure 1:
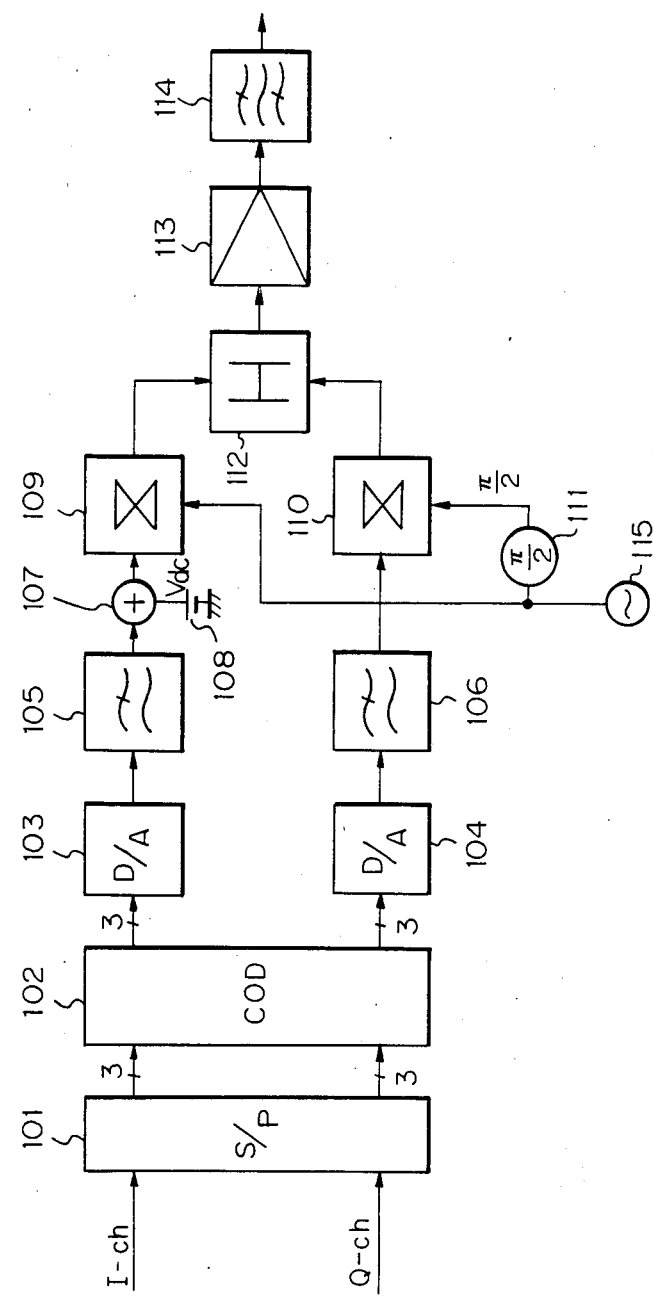
FIG. 1 is a block diagram of an embodiment of a modulator in a transmission system of a radio communication system of the QAM type according to the present invention.

FIG. 1 shows the circuit of a modulator of the transmission system in a 64-state QAM system. Pulse-code modulated (PCM) transmission data, at a rate such as 45M bit per second (bps), which is applied to an input stage (not shown) is separated into binary data composed of I-ch (In phase) data and Q-ch (Quadrature phase) data. Each set of data is applied to an S/P (serial to parallel) converter 101 for conversion into a parallel data signal. The S/P converter 101 also divides the parallel data signal into two sequences, each having three bits of 15M bps. At this time, the clock becomes ⅓ frequency, that is, 15 MHz.

The parallel data signal is next supplied to an encoder (COD) 102. Here, low frequency component suppression control, described in detail later, is effected for encoding in which a direct current component and a low frequency component of the spectrum after D/A conversion are suppressed. During this encoding, each six channels form a frame of 32 bits. Further, one bit of a frame slot is added to form a frame including a total of 33 bits.

The two sequences of binary signals, each including 3 encoded bits are applied to D/A converters 103 and 104 for conversion into analog signals and formation of a pulse amplitude modulation (PAM) signal having 8-levels within the analog signal. The outputs of the D/A converters 103 and 104 are applied to low pass filters 105 and 106 for restricting the frequency band. The output of the filter 105 is supplied to an adder 107. The adder 107 and a direct-current offset source 108 working with the adder 107 are provided for supplying an offset for the carrier waves, mentioned in detail hereinafter.

The PAM signals, one of which has been given an offset $V_{dc}$ as explained above, are further supplied to mixers 109 and 110. Two orthogonal carrier waves cos $\omega t$ and sin $\omega t$ made different in phase by $\pi/2$ by a $\pi/2$ phase shifter 111 are supplied from a carrier frequency oscillator 115 to the mixers 109 and 110 for modulation therein. The two sequences of quadrature signals are synthesized in a hybrid circuit 112 and amplified by an intermediate frequency amplifier 113. A signal component of a desired band is allowed through by a band-pass filter 114.

The output signal of the band-pass filter 114 is upconverted to 4 GHz in a high frequency section (not shown), amplified to a sending level by a high output transmitting amplifier (not shown), and supplied to an antenna (not shown). The amplified transmitting signal is supplied from the antenna via radio transmission to a receiving system of a 64-state QAM type, mentioned hereinafter.

Figure 2:
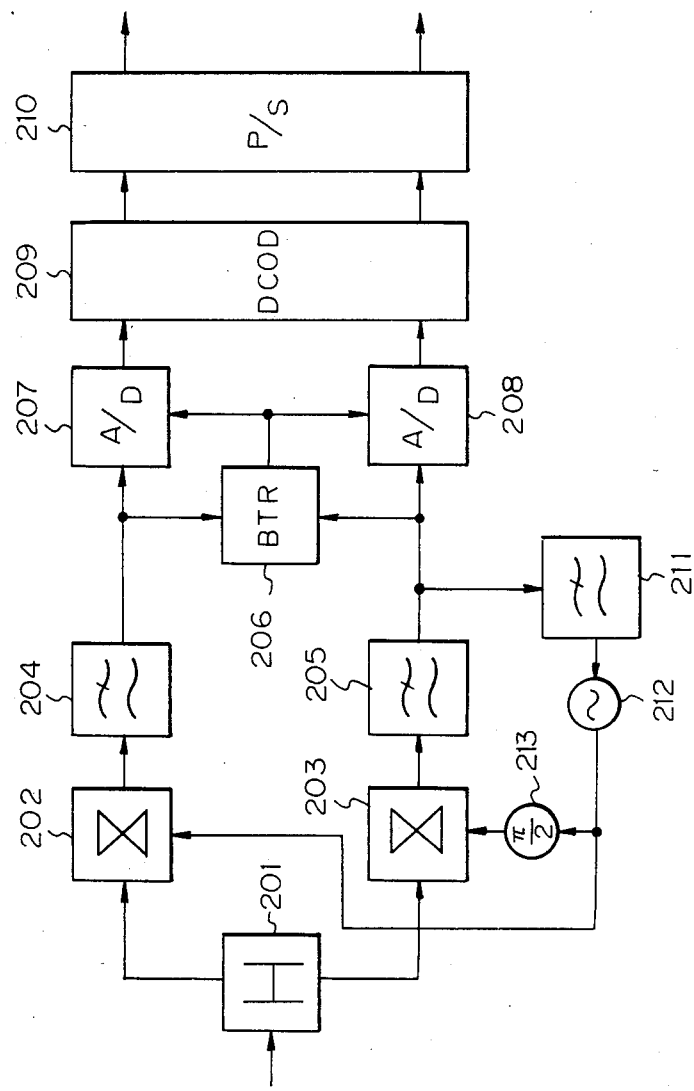
FIG. 2 is a block diagram of an embodiment of a demodulator in a receiving system of the radio communication system according to the present invention.

FIG. 2 is a circuit diagram of a modulator in the receiving system of the 64-state QAM type. The 4 GHz modulated wave is received by an antenna (not shown) and supplied via a down converter, a low noise amplifier, a space diversity receiver, and an equalizer (all not shown) to a hybrid circuit 201 as an input signal to the modulator. The input signal is divided into two sequences, which are then multiplied by cos $\omega t$ and sin $\omega t$ in the regenerative carrier waves in mixtures 202 and 203 for demodulation. The two sequences of baseband receiving signals obtained by this demodulation are supplied via low-pass filters 204 and 205 to a bit timing recovery (BTR) circuit 206 and analog to-digital (A/D) converters 207 and 208, respectively. In the BTR circuit 206, a clock frequency is regenerated. This regenerated clock is used for the A/D conversion in the A/D converters 207 and 208. The digital signals are frame-synchronized in a decoder 209, then the digital signals encoded in the transmitting system are obtained. The decoder signals are parallel/serial (P/S) converted in a P/S converter 210 for recovery of the transmitted data of the 45M bps$\times$2.

The regenerated carrier waves applied to the mixers 202 and 203 are obtained by maintaining at zero the output of the low-pass filter 205 in a channel without the offset by using the output of the low-pass filter 205 obtained via the low-pass filter 211 to control a 70 MHz voltage-controlled oscillator 212 and by making the output produced different in phase by exactly $\pi/2$ using a $\pi/2$ phase shifter 213.

Figure 3:
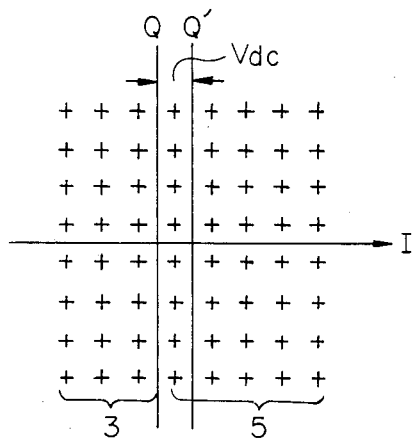
FIG. 3 is a schematic diagram of distribution of modulated points of in-phase channel (I-ch) data and quadrature channel (Q-ch) data.

FIG. 3 is a signal space diagram of the modulated signal of I-ch data and Q-ch data. I-ch is shown with abscissa I and Q-ch is shown with ordinate Q in the case of 64 states. In FIG. 3, Q' shows the position of the ordinate in a conventional, usual 64 state QAM. However, since the direct current offset source 108 shown in FIG. 1 applies a direct current offset $V_{dc}$ to the I-ch signal, the original Q' axis is shifted by $V_{dc}$ and is practically the same as the Q axis. Usually, the right side phase components and the left side phase components appear with about the same probability with respect to the Q' axis. This is because the 64-state modulation points appear completely randomly. When the modulation points appear randomly with respect to the Q' axis and I axis, a carrier wave component does not appear toward any special direction. However, if an offset of $V_{dc}$ is applied to shift the axis from Q' to Q, the right side phase component and the left side phase components appear with an imbalance of 5:3 and an excess level of 2 (5$-$3) appears on the right side, so that a leakage carrier wave always appears. As a result, the carrier wave appears in the modulation signal.

Figure 4:
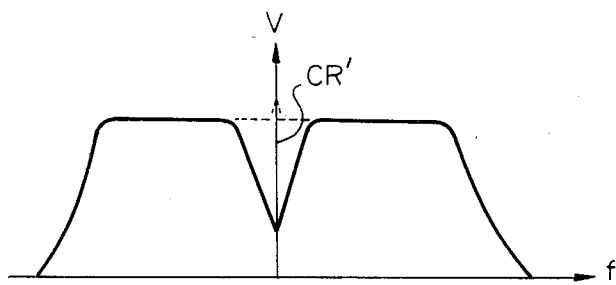
FIG. 4 is a diagram of a data spectrum used in the transmission system shown in FIG. 1.

FIG. 4 is a diagram of an output spectrum of the transmission system. The abscissa shows a frequency f, and the ordinate shows a voltage V. This spectrum shows a modulated signal, that is, the output of the transmission system. It is usually flat, as shown by the dotted line in FIG. 4, i.e., the carrier component does not appear at all. However, a leakage carrier wave CR' appears due to the offset mentioned above. That is, the carrier wave component simultaneously appears in the modulated transmission signal. At this time, to facilitate taking out the leakage carrier wave, the signal component near the leakage carrier wave in FIG. 4 is suppressed by lower frequency component suppression, mentioned later. This suppressed component is recovered by the decoder 209 of the demodulator shown in FIG. 2.

The method for suppressing the lower frequency component, the encoding in the encoder 102 necessary for the method, and the decoding in the decoder 209 necessary for the method will be explained later. In the following explanation, only one channel (I-ch) is considered for convenience.

Figure 5:
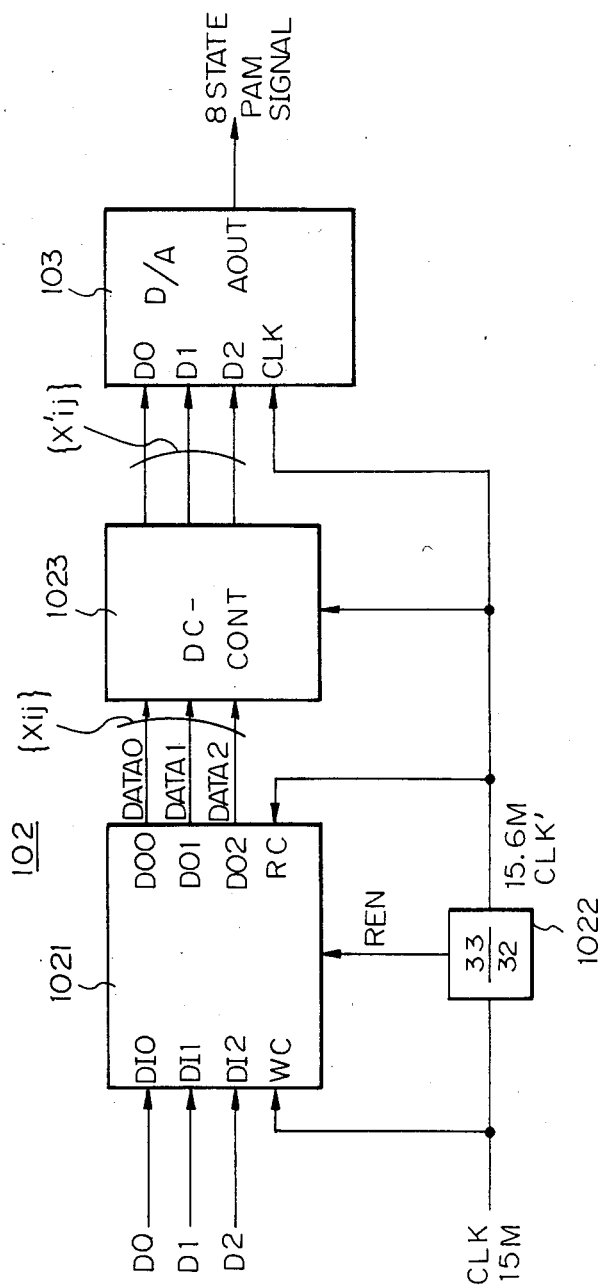
FIG. 5 is a block diagram of the construction of an encoder 102 shown in FIG. 1.
Figure 6:
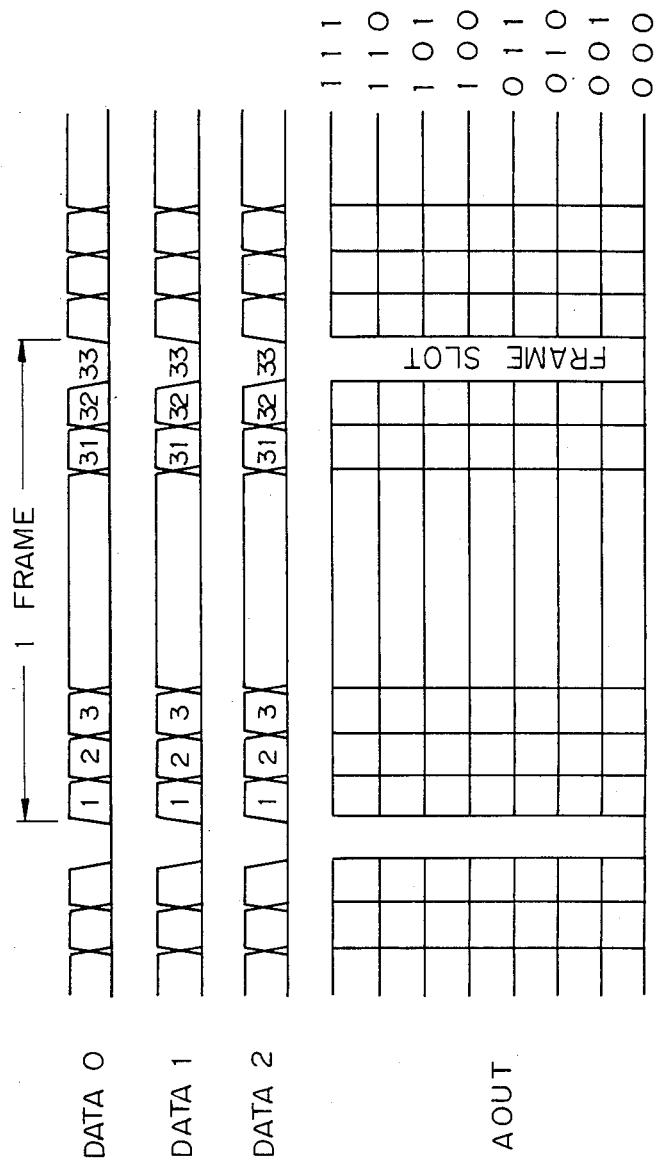
FIG. 6 is a diagram of data after series/parallel (S/P) conversion and data after digital/analog (D/A) conversion in FIG. 1.

In FIG. 5, three bits of parallel binary data $D_0$, $D_1$, and $D_2$ converted by the S/P converter 101 are written in an elastic or RAM storage 1021 in the encoder 102 with a clock CLK of 15 MHz. The clock is frequency-converted by a frequency converter 1022 having a conversion ratio of 33/32 so as to become a clock CLK' of 15.6 MHz. This clock CLK' of 15.6 MHz reads out the data from the elastic storage 1021 for 32/33 of the period and stops the read-out operation for 1/31 of the period by disabling the read-out enable (REN) signal and creating a flag frame. In this way the frame data DATA 0, DATA 1, and DATA 2 (FIG. 6) are obtained at the output of the elastic storage or RAM 1021. These three bits of data are converted by a lower frequency component suppression circuit 1023 and then sent to a D/A converter 103 for conversion into a PAM signal A OUT (FIG. 6) having $2^3=8$ values. Here, the data of the frame slot are all zero, and the data output signal A OUT of the D/A converter 103 is set to (0, 0, 0).

The D/A converter 103 forms 8 states with respect to the data (DATA 0, DATA 1, DATA 2)=(0, 0, 0) to (1, 1, 1), so that the input signal sequence DATA IN (DATA 0, DATA 1, DATA 2) can be considered to have the value 0 to 7 based on the combination of the three bits. The three bits are considered as a single signal $\{X_{ij}\}$ and the following definitions apply.

$x_{ij}$: j'-th data in ith frame ($-\infty < i < +\infty$, $0 \leq j \leq N$, $0 \leq x_{ij} \leq 7$) where N is the number of data slots in one frame, N being 32 here.

$N+1$: the number of time slots in one frame (frame slot is one bit)

$S_i$: a summation over one frame in the i'-th frame $<S_i>$: a deviation of $S_i$ when, in DATA$_i$ (i=0, 1, 2), 1 and 0 have equal probability, $x'_{ij}$: a sequence of the output data previously converted by the lower frequency component suppression circuit ($0 \leq j \leq N+1$)

$D_k$: a deviation of the summation value in the k'-th frame of a converted data sequence;

$\tilde{D}_n$: a deviation of the average value of all sequences until the n'th frame of a converted data sequence, $SGNS_i$: a polarity of $<S_i>(+1/-1)$, $SGND_n$: a polarity of $\tilde{D}_n(+1/-1)$, $C_i$: a control signal of the i'-th frame for all sequences $\{x_{ij}\}$ Using the above-mentioned definitions, a qualitative explanation will be given below.

All $x_{ij}$'s take a single value from 0 to 7. Therefore, if 1 and 0 in DATA$_i$ appear with equal probability, the average value of $x_{ij}$ becomes $7/2=3.5$. Whether the value $S_i$ which is obtained by adding all data in a specified frame (i'th) is larger or smaller than the value $3.5 \times 32$ (ideal mean value) assumed as the mean value is determined, and its polarity $SGNS_i$ is formed. When this polarity $SGNS_i$ is the same as the polarity of $SGNS_i$ of the mean value of the total of all frames up to this time, all present sequences $\{x_{ij}\}$ are inverted so that the mean value does not tend to one side. Then, a flag $X_{FRM}$ showing this inversion is inserted in such a manner that it can be recovered in the receiving side. Here, the control signal for controlling the inversion/non-inversion is designated as $C_i$, and the converted data sequence which is controlled is designated as $\{x'_{ij}\}$. As the mean value of all frames should be determined for the converted data sequence, $D_k$ becomes the cumulative value for $\{x'_{ij}\}$ plus the flag.

That is, $$<S_i> = S_i - 112$$

As $0 \leq S_i \leq 224$, the value of $<S_i>$ has a positive value or a negative value. Further, $$D_k = \sum_{j=1}^{N} x'_{kj} + X_{FRM} - 112$$

where $X_{FRM}$ is flag data which is inserted for showing inversion/non-inversion. Therefore, in the case of non-inversion, $$D_k = S_k - 112 \ (X_{FRM}=0)$$

in the case of inversion, $$D_k = 112 - S_k + X_{FRM}$$

wherein the flag $X_{FRM}$ showing inversion can be determined freely. Here, however, it is determined as $X_{FRM}=(1, 1, 1)$.

$\tilde{D}_k$ satisfies the following equation.

$$\tilde{D}_k = \tilde{D}_{k-1} + D_k$$

$$D_{-\infty} = 0$$

$$\tilde{D}_n = \sum_{k=-\infty}^{n} D_k$$

That is, $\tilde{D}_n$ is the cumulative value of data in all frames until the n'th frame. If inversion/non-inversion is not carried out, $\tilde{D}_n$ diverges when $n \to \infty$. "Diverge" means that the polarities of all data are on one side of the mean value. For the purpose of preventing this, $D_k$ is controlled so that $\tilde{D}_n$ is converged within several frames when $n \to \infty$.

$$SGNS_i = sgn(S_i - 112) \quad (1)$$

$$SGND_i = sgn(\tilde{D}_n) \quad (2)$$

Figure 7:
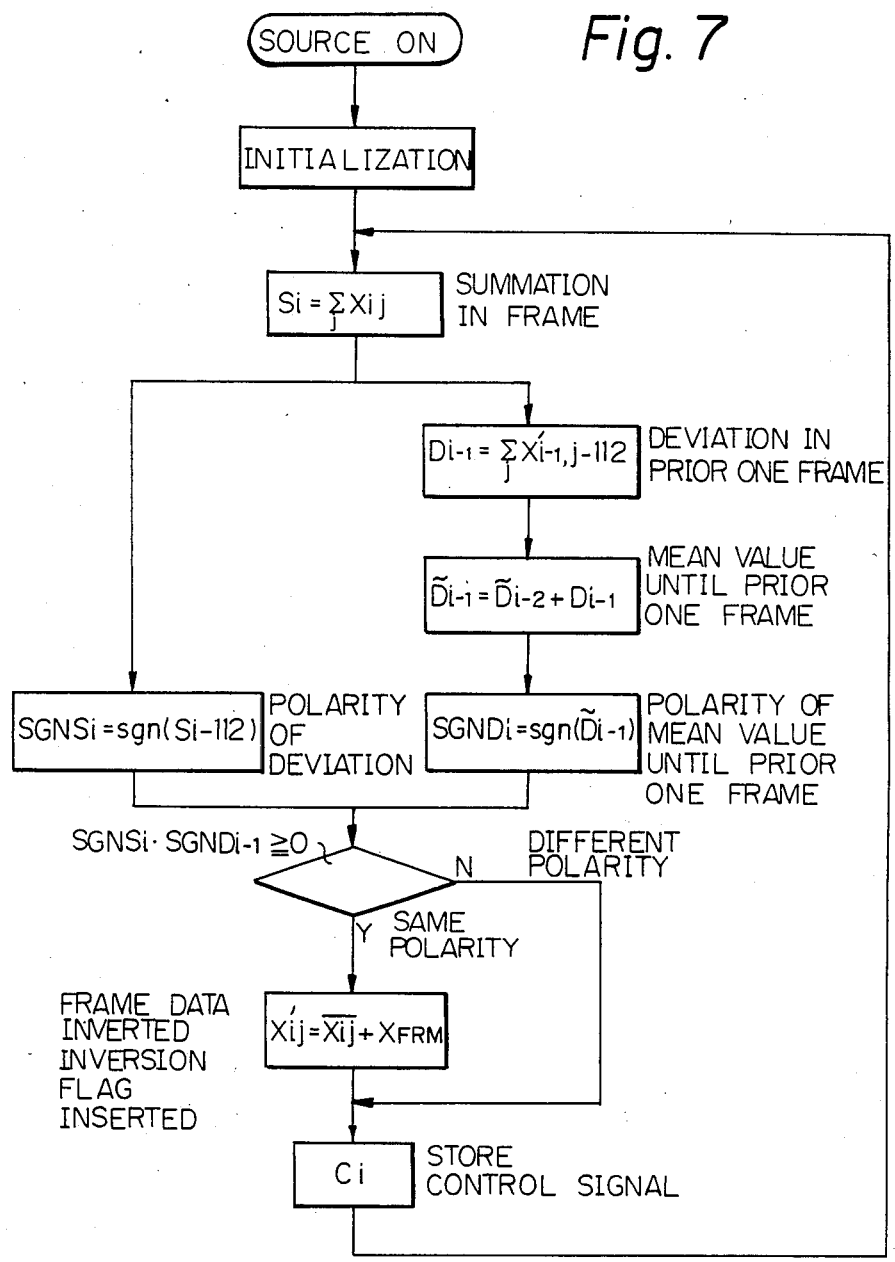
FIG. 7 is a flow chart of a control process in a lower frequency component suppression circuit 1023 shown in FIG. 5.

FIG. 7 is a flow chart of the process of lower frequency component suppression control. The problem in this process is that the frame clock $f_{CLK}$ has a high speed, such as 15.6 MHz and thus the execution of (1) and (2) above cannot be carried out by a general purpose microprocessor. Therefore, an arithmetic and logic unit must be formed using random or discrete logic.

Figures 8, 8A:
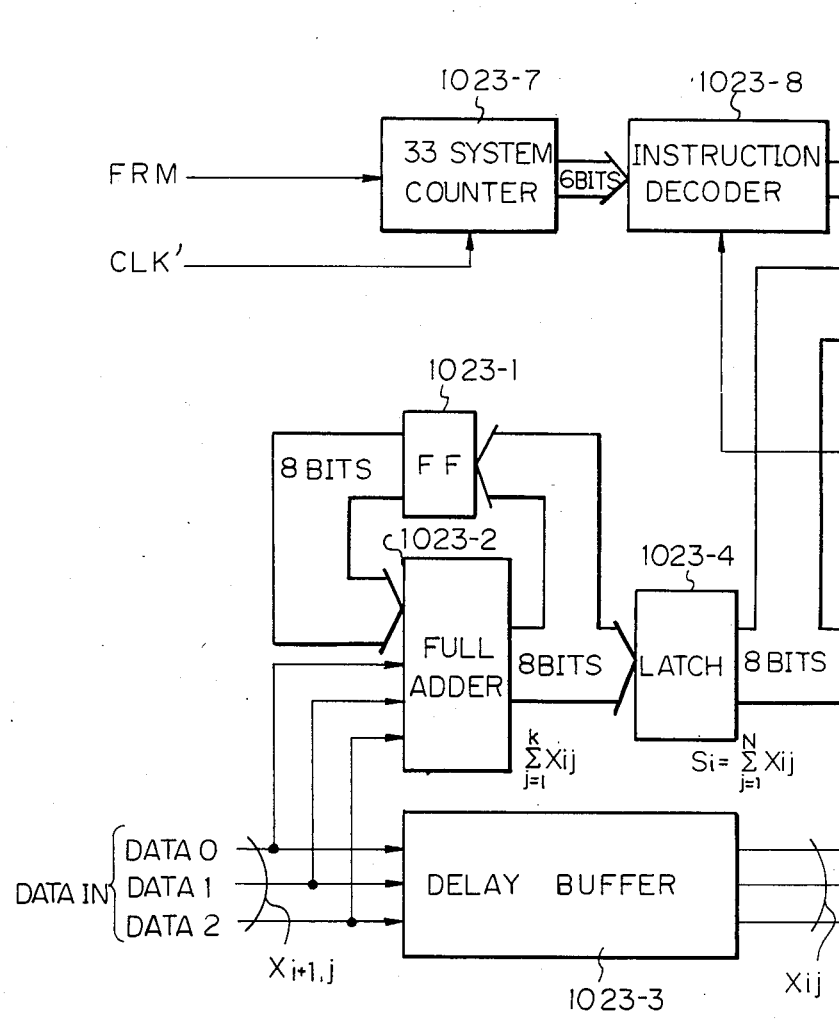
FIG. 8, including 8A and 8B, is a block diagram of a concrete embodiment of the lower frequency suppression circuit 1023 shown in FIG. 5.
Figure 8:
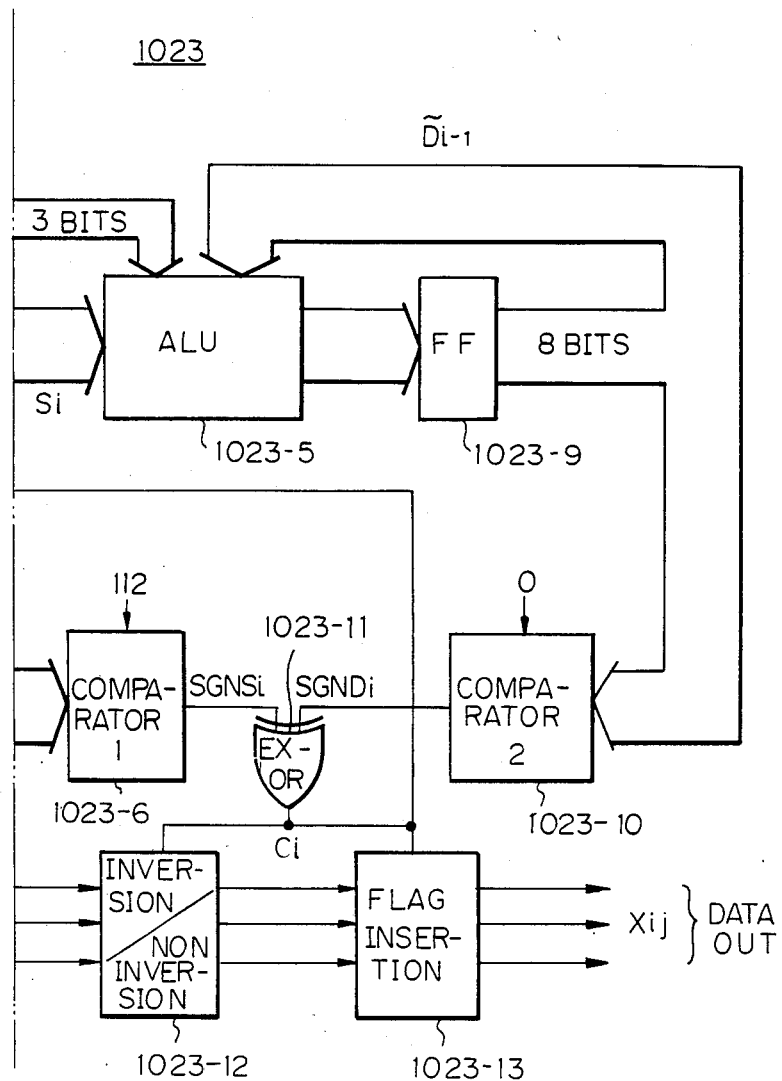

FIG. 8 shows the construction of the lower frequency component suppression control circuit 1023. The data (DATA 0, DATA 1, DATA 2) are input to a full adder 1023-2 connected as a cummulative circuit and a flip-flop (FF) 1023-1. The data is also input to a delay-buffer 1023-3 comprising a (33+α) bit shift register. The cumulative value $$\sum_{j=1}^{k} x_{ij}$$

is obtained at the output of the summation circuit 1023-2. The cumulative value $$S_i = \sum_{j=1}^{N} x_{ij}$$

of one frame is applied via a latch circuit 1023-4 to an arithmetic and logic unit (ALU) 1023-5 and a comparator 1023-6. The comparator 1023-6 compares the value 112 with $S_i$ and outputs the result as $SGNS_i$.

Using the control signal $C_i$, through the decoder 1023-8 causes the ALU 1023-5 to compute $\tilde{D}_{i-i}$, that is, the deviation of the cumulative value in the preceding frames in the data sequence converted by the control, and $\tilde{D}_{i-1}$, that is, the average deviation of all sequences of converted data sequences up to the prior one. The computation instruction is output by an instruction decoder 1023-8 which decodes the output of a 33-system counter 1023-7 counting at a clock rate of 15.6 MHz (CLK').

$\tilde{D}_{i-1}$ obtained at the output of the ALU 1023-5 is supplied to an input of a comparator 1023-10 via a flip-flop 1023-9 and also to another input of the ALU 1023-5 for the next operation. The comparator 1023-10 compares $\tilde{D}_{i-1}$ and 0 and outputs the result as $SGND_{i-1}$.

The above $SGNS_i$ and $SGND_{i-1}$ are supplied to an exclusive OR circuit (EX-OR) 1023-11, and a control signal $C_i$ is obtained at its output. This control signal $C_i$ is applied not only to the above-mentioned instruction decoder 1023-8, but also to an inversion/non-inversion circuit 1023-12 and a flag insertion circuit 1023-13. When $SGNS_i$ and $SGND_{i-1}$ have the same polarity, the output xij of the delay buffer 1023-3 is inverted in the inversion/non-inversion circuit 1023-12, and a flag $X_{FRM}$ is inserted in the frame slot in the flag inversion circuit 1023-13.

The values which the above-mentioned signals can take are shown below.

$$0 \leq x_{ij} \leq 7$$

$$0 \leq S_i \leq 224$$

The value of $D_k$ differs in accordance with inversion/non-inversion. In the case of non-inversion, $$-112 \leq D_k = S_k - 112 \leq 112$$

in the case of inversion, $$-108 \leq D_k = 116 - S_k = 116$$

Therefore, $$-112 \leq D_k \leq 116$$

From the above, the data necessary which is sufficient in an 8-bit operation can be handled, as the data bus for the operation, 8 bits are used.

Figure 9A:
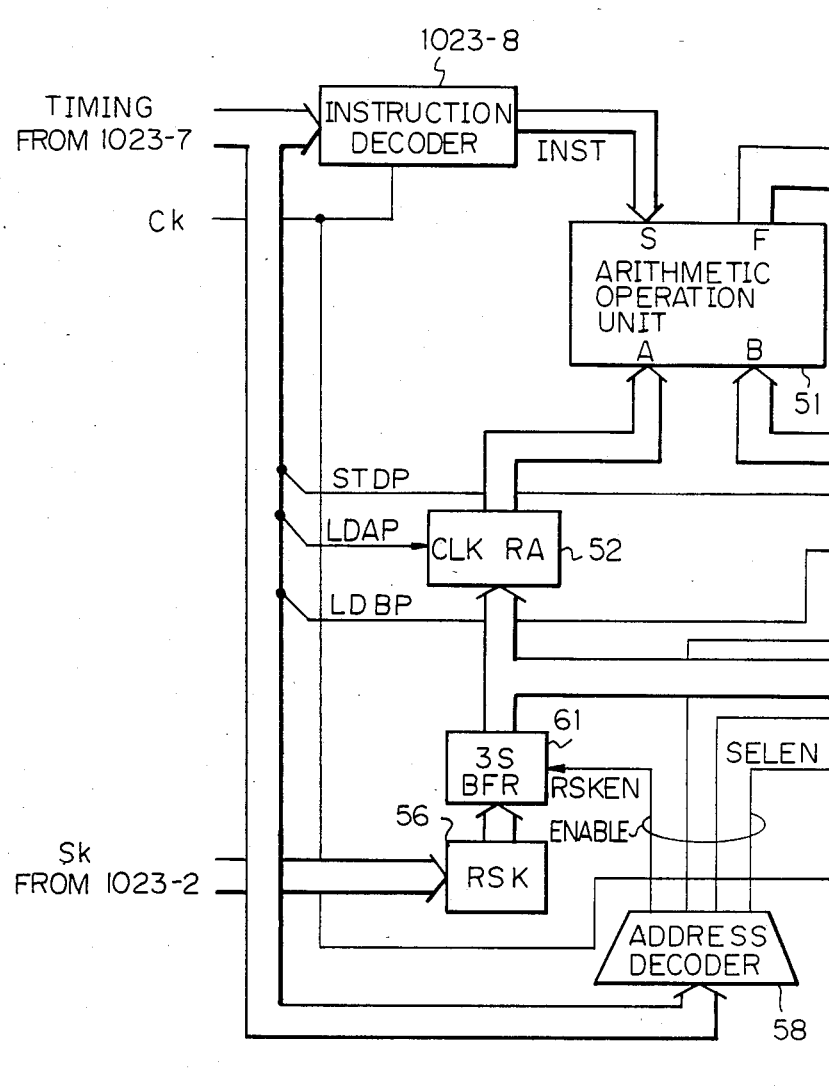
FIG. 9, including 9A and 9B, is a block diagram of a detailed circuit of an arithmetic and logical unit shown in FIG. 8.
Figure 9B:
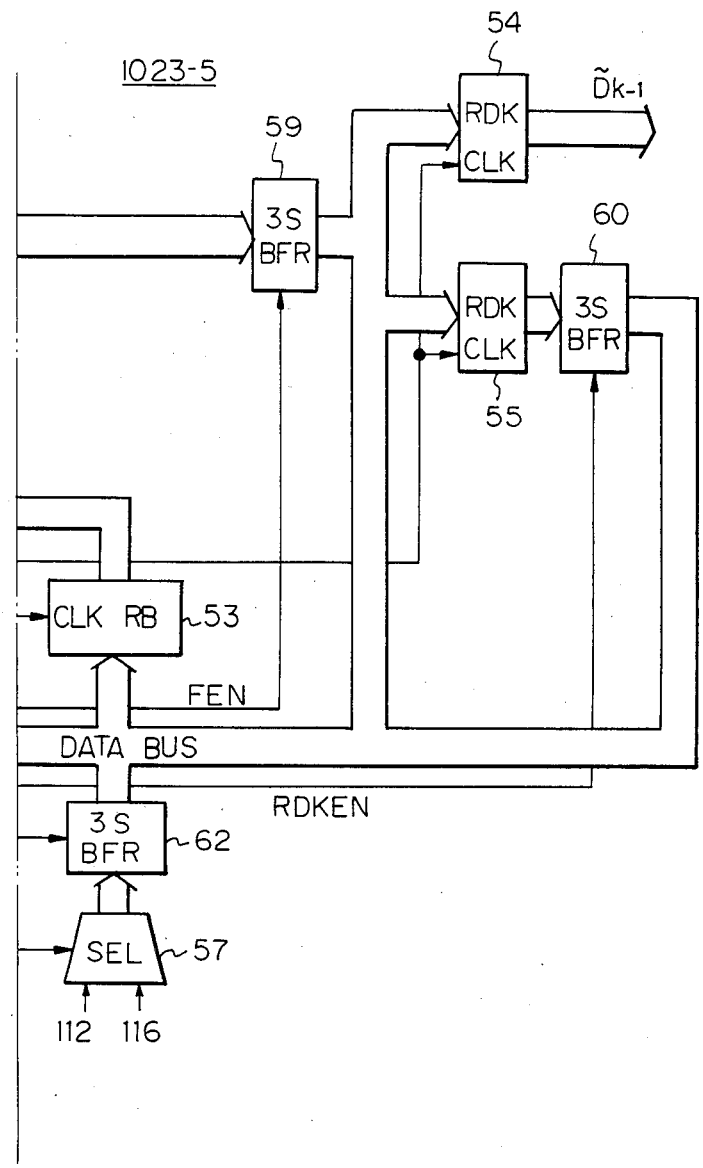

FIG. 9 shows the elements of the ALU 1023-5 of FIG. 8. The timing pulse and the control signal $C_k$ formed by the output of the counter 1023-7 in FIG. 8 are used for determination of an instruction (INST) in the instruction decoder 1023-8, whereupon a computation instruction is output to an arithmetic operation unit 51. At this time, the subject of the operation (operand) is stored in two registers (RA, RB) 52 and 53. The results F of the operation are stored in $\tilde{D}_{k-1}$ registers (RDK) 54 and 55. These values are again stored and operated on in the registers 52 and 53 via the data bus, if necessary.

The output $S_k$ of the latch circuit 1023-4, that is, the output $S_k$ of the full adder 1023-2 in FIG. 8, is stored in an $S_k$ register (RSK) 56. A selector (SEL) 57 selects one of 112 or 116 in accordance with the state of the control signal $C_k$. An address decoder 58 decodes timing pulses and forms enable signals (RSKEN, SELEN, FEN, RDKEN) for 3-state buffers (3 SBFR) 59 to 62 independently. A data bus (DATA BUS) is released by the enable signals for writing and reading of the registers. The data bus is three-state controlled. The output of the register becomes a high impedance state except when the output is enabled by the enable signal from the address decoder 58.

Three kinds of instructions (INST) are executed by the arithmetic operation unit 51: (AD) A+B and subtraction (SB) A−B and B−A. Load (LD) and store (ST) for registers 52, 53, 54, and 55 are carried out at a set time during one frame by timing signals formed by decoding the output of the counter 1023-7. The combination of the operands 1 and 2 for each instruction are restricted as shown in the following table, so that generality in the arithmetic operations are lost. However, the scale of the circuit can be minimized and the time required for the operation can be decreased.

| INST | OPERAND 1 | OPERAND 2 |
| --- | --- | --- |
| LD | RA | RSK |
|  |  | F |
|  | RB | SEL (112, 116) |
|  |  | RDK |
| ST | F | RDK |
| AD | RA | RB |
| SB | RA | RB |
|  | RB | RA |

Figure 10:
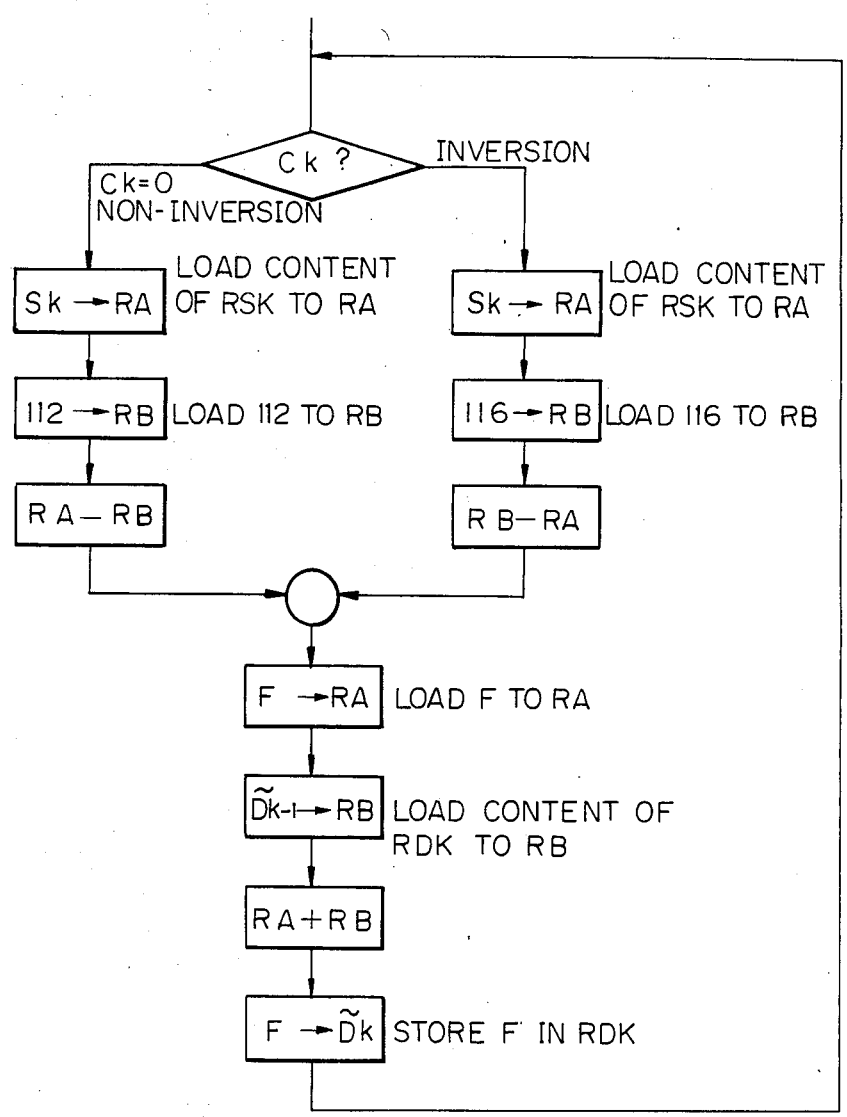
FIG. 10 is a flow chart of the process of operation of the arithmetic and logical unit 1023-5 shown in FIG. 9.
Figure 11:
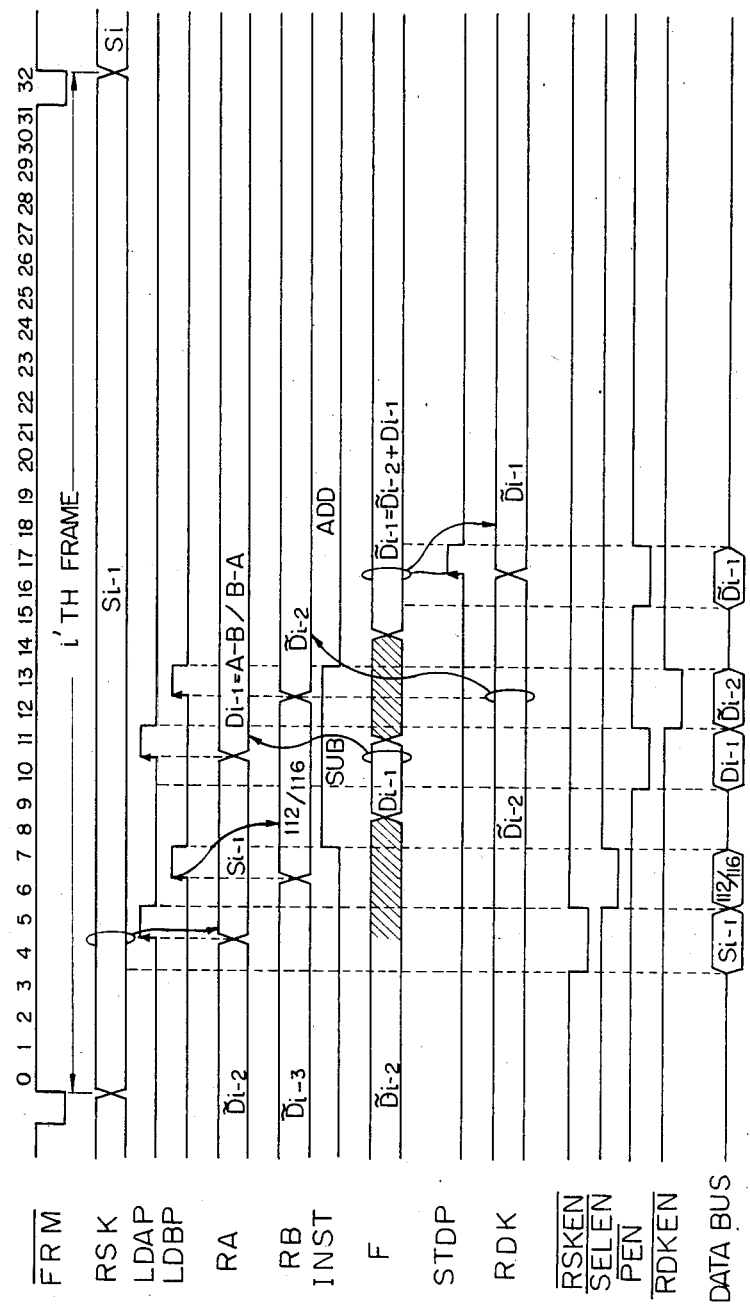
FIG. 11 is a time chart explaining the process of the arithmetic and logical unit 1023-5 shown in FIG. 9.

The process of the operation in the arithmetic and logical unit 1023-5 is shown in the flow chart of FIG. 10 and the timing chart in FIG. 11. The control timing is shown in FIG. 12.

Figure 12:
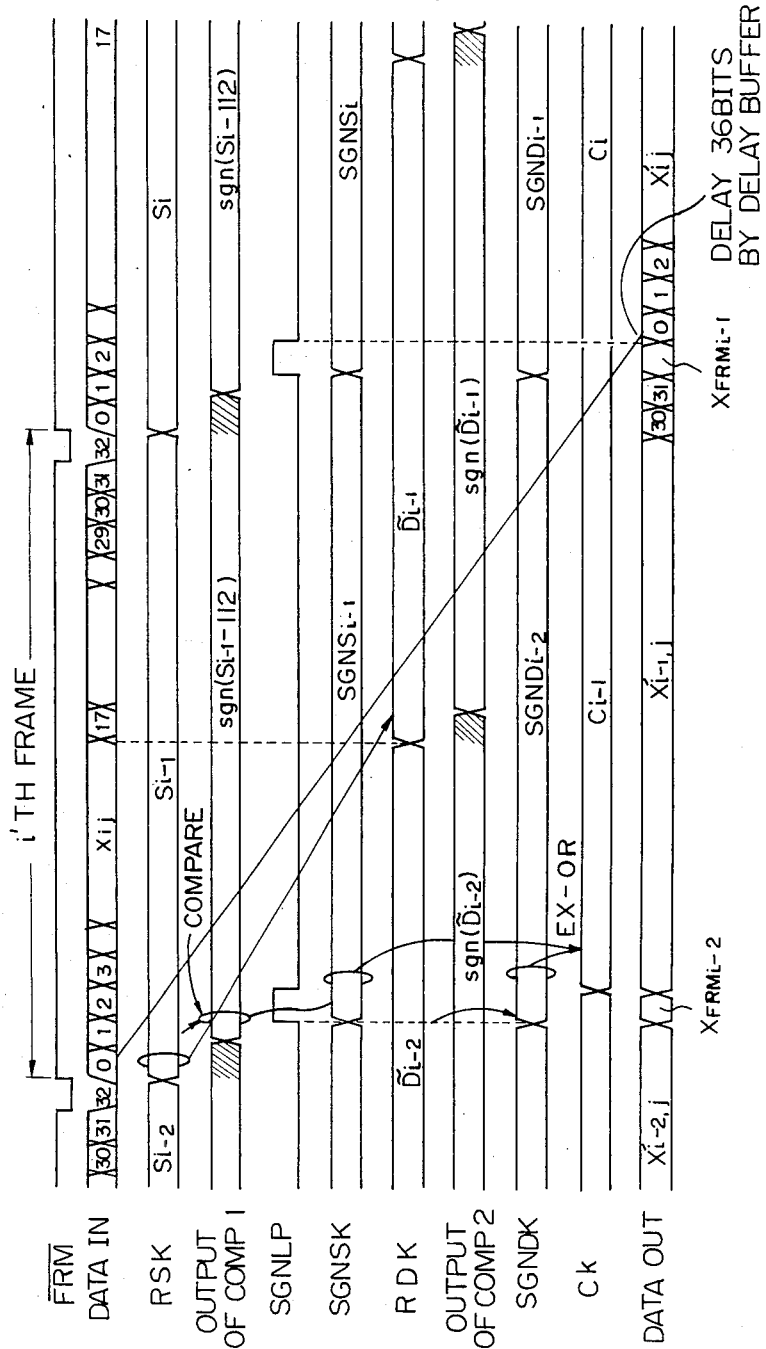
FIG. 12 is a time chart explaining the control of the lower frequency component suppression circuit 1023 shown in FIG. 8.

Especially, FIG. 12 shows the temporal relationships between the input data sequence (DATA IN) and the output data sequence (DATA OUT). The (i−1)'th data sequence $\{x_{i-1, j}\}$ forms the inversion/non-inversion control signal by the exclusive OR of the output $SGNS_{i-1}$ of the comparator 112 of the cumulative value $S_{i-1}$ in the frame and the cumulative value $SGND_{i-1}$ of all frames up to the one before. A time difference of one frame exists between $\{x_{ij}\}$ and $S_{i-1}$, so the data controlled by Ck must be delayed by the amount of one frame. As $C_k$ is retimed, $\{x_{ij}\}$, including a further delay, is delayed 36 bits in the delay buffer 1023-3. The inversion/non-inversion and the insertion of the flag in the flag frame are carried out in the selector. Further, the position of the frame is changed from the frame pulse (FRM) showing the original time position to a new pulse (SGNLP). This is because this control is accompanied by a delay of more than one frame, that is, 36 bits.

Figure 13:
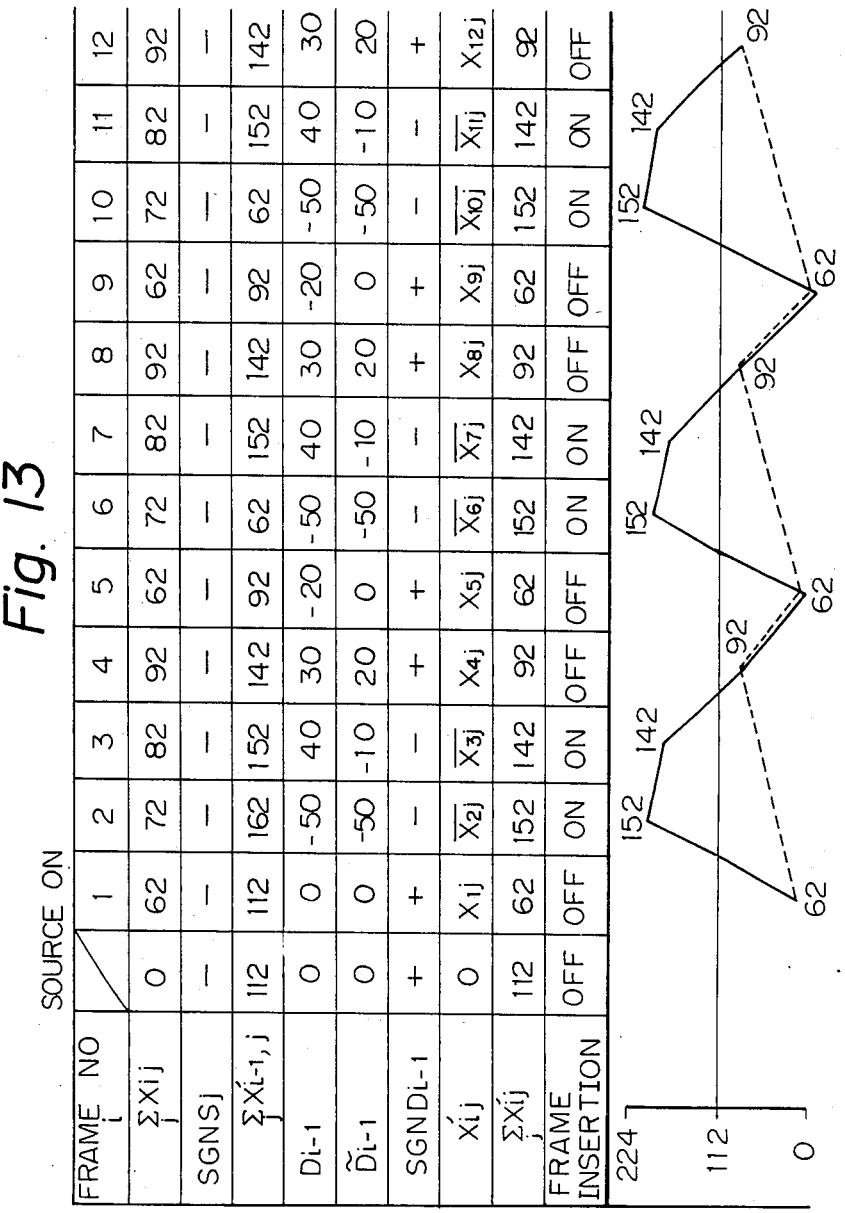
FIG. 13 is a diagram showing an example of conversion due to the lower frequency component suppression circuit 1023 shown in FIG. 8.

A concrete example of the conversion by the low frequency component suppression circuit 1023 is shown in FIG. 13. In FIG. 13, the dotted line shows the cumulative value of each frame before the conversion and the solid line shows the cumulative value of each frame after the conversion. FIG. 13 shows that the cumulative value after conversion does not incline to one side with respect to a DC level of 0.

In a multistate QAM system, which previously suppresses the low frequency component of the transmission spectrum so as to generate the carrier wave, as a method for inserting the service channel in FIG. 1, the carrier wave applied to the mixers 109 and 110 can be frequency-modulated by the service channel signal, that is, a composite modulation system can be used. However, in this system, a carrier wave having good quality cannot be obtained. Further, the error rate of the data rises.

Figure 14:
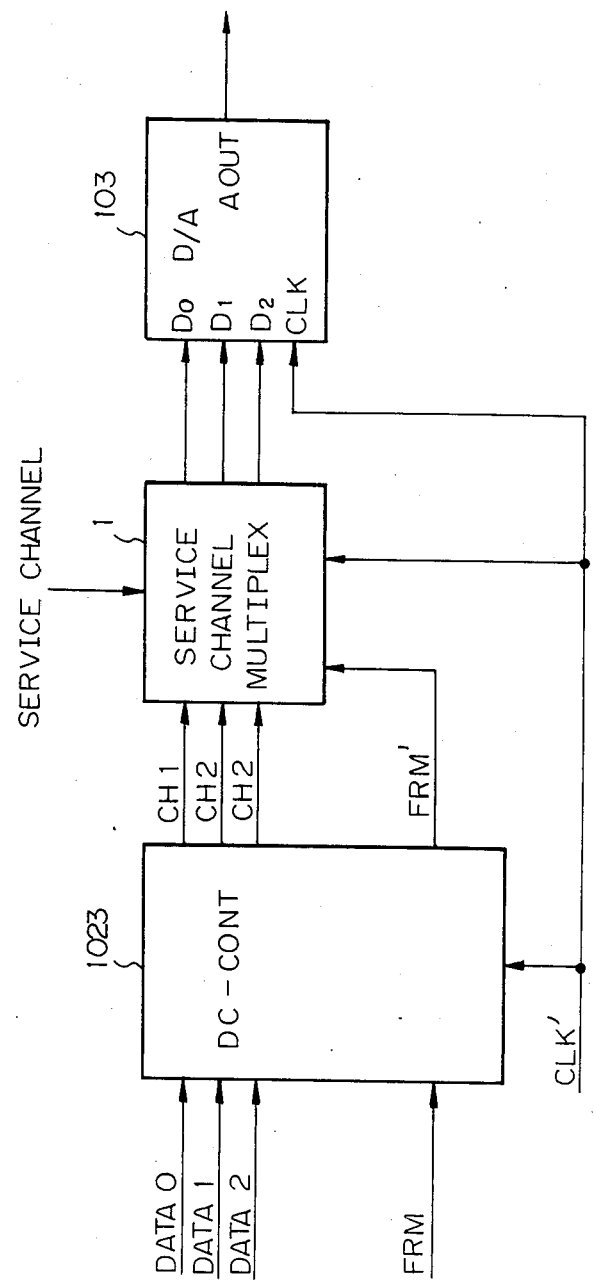
FIG. 14 is a block diagram of a circuit 1 for inserting a service channel signal according to the present invention.
Figures 18, 19:
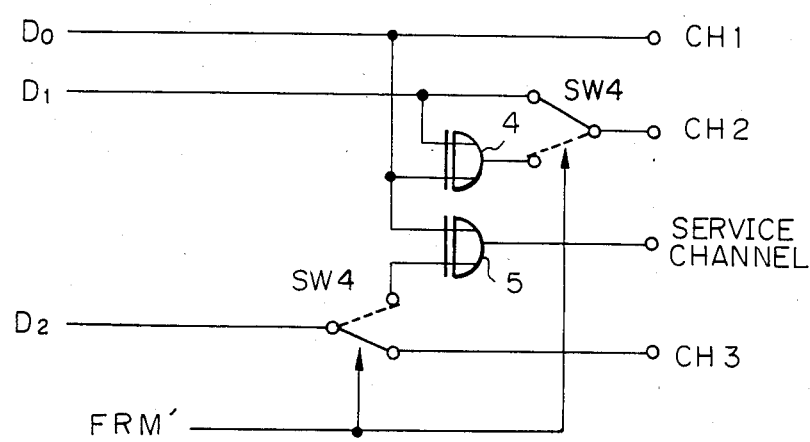
FIG. 18 is a circuit for separating the inversion/noninversion signal and the service channel signal.
FIG. 19 is a diagram showing a code conversion performed in the circuit shown in FIG. 18.

FIG. 14 is a block diagram explaining the insertion of a service channel signal in the embodiment of the present invention and corresponds to the previous FIG. 5. Elements having same function as those in FIG. 5 are designated by the same symbols. Reference numeral 1 designates a service channel multiplex portion. FIG. 15 is a detailed diagram of the service channel multiplex portion shown in FIG. 14. Reference numerals 2 and 3 designate exclusive OR circuits, and $SW_1$ and $SW_2$ designate switches. FIG. 16 is a code conversion diagram of FIG. 15; FIG. 17 is a level diagram of a signal for inserting a service channel signal and the inversion/non-inversion signal; FIG. 18 is a circuit for separating the inversion/non-inversion signal and the service channel signal, reference numerals 4 and 5 showing exclusive OR circuits and $SW_3$ and $SW_4$ showing switches, and FIG. 19 is a code conversion diagram in the case of FIG. 18.

For inserting a service channel signal as shown in FIG. 14, the service channel multiplex portion 1 is inserted between lower frequency component suppression circuit 1023 and D/A converter 103 in FIG. 5. The service channel signal is inserted from the service channel into a frame slot using time division multiplexing together with the inversion/non-inversion signal in such a manner that it is placed near the maximum side or near the minimum side of the 8 level signal. This method is explained by using FIG. 15, FIG. 16 and FIG. 17.

In FIG. 15, the switches $SW_1$ and $SW_2$ are connected as shown with the solid line except during the flag frame slot, and the signal input from the lower frequency component suppression circuit 1023 in FIG. 14 is output to the D/A converter 103 side. In the flag frame slot, switches $SW_1$ and $SW_2$ are switched as shown by dotted lines, by the flag frame signal FRM'. In the frame slot, the inversion/non-inversion signal 1 or 0 is placed on $CH_1$, and $CH_2$ and $CH_3$ remain the 0 level. The service channel signal 0 or 1 is input from the service channel. The switches $SW_1$ and $Sw_2$ are connected to the dotted line side, the signal in $CH_1$ appears at the output $D_0$, the signal obtained in the exclusive OR circuit 2 by which the $CH_1$ and $CH_2$ signals are rendered exclusive OR appears at the output $D_1$, and the signal obtained in the exclusive OR circuit 3 by which the $CH_1$ and service channel signals are rendered exclusive OR appears at the output $D_2$. That is, as shown by $CH_1$, $CH_2$, and service CH in FIG. 16, four kinds of the signals are input: service channel signals 1 and 0 in the case of a 0 representing a non-inverted signal input from $CH_1$ and service channel signals 1 and 0 in the case of an inverted signal. These are code converted to 111, 110, 000, 001 as shown in $D_0$, $D_1$, and $D_2$ in FIG. 16. These signals become, in the output of the D/A converter 103, signals near the maximum level or the minimum level of the 8 level signals as shown in FIG. 17. In this case, as the level difference between 110 and 001 is large, no error is caused in the inversion/non-inversion signal if the service channel signal is inverted. Further, if this signal is to be separated on the receiving side, a circuit such as shown in FIG. 18 is used. Switches $SW_3$ and $SW_4$ are connected to the solid line sides except during the flag frame slots in accordance with FRM', so that the signals input from $D_0$ to $D_2$ are output to $CH_1$, $CH_2$ and $CH_3$. In the flag frame slot, the switches $SW_3$ and $SW_4$ are changed to the dotted line sides. When the signal from $D_0$ appears at $CH_1$, the signal obtained in the exclusive OR circuit 4, by which input from $D_0$, $D_1$ are rendered exclusive OR, appears at $CH_2$, the signal obtained in the exclusive OR circuit 5, by which the signals input from $D_0$ and $D_2$ are rendered exclusive OR, appear at the service CH, and the original signal can be obtained in $CH_1$, $CH_2$, and the service channel as shown in FIG. 19.

As the signal component near the injected carrier wave is cut without using a filter, the carrier wave can be simply formed, so that construction of a complex circuit as conventionally required is not necessary.

Also, the error rate, is irrelevant. Therefore, even when the error rate is high, a carrier wave having a good S/N ratio can be regenerated. Further, an absolute phase can be obtained so that a differential logic circuit is not necessary.

Finally no deterioration of the error rate is caused by the inversion/non-inversion signal even if the service channel signal is inserted into the frame slot, so that it has the effect that the service channel signal can be inserted without causing deterioration in the data.

We claim:

1. A radio communication system using quadrature amplitude modulation (QAM), comprising:
    transmission system means for sending a composite signal, after modulating data of a first channel from an I-channel system and data of a second channel from a Q-channel system using two carrier waves having phases different by $\pi/2$ from each other; and
    receiving system means for receiving said composite signal, separating the received signal into a first received signal including the data of said I-channel system and a second received signal including the data of said Q-channel system, and demodulating said first and second received signals using two regenerated carrier waves having phases different by $\pi/2$ from each other to regenerate the original data;
    said transmission system means comprising:
        means for dividing the data from each channel to be transmitted into data groups;
        means for adding the data in a current data group to produce a cumulative value of all of said current data group and to determine a polarity of a deviation of said cumulative value from a mean value of an ideal cumulative value of the addition of the data groups;

means for determining a polarity of a mean value of a deviation of all prior data groups prior to the current data group;

encoding means for comparing the polarities of the mean value of the deviation of the current data group and the mean value of the deviation of the prior data groups prior to the current data group, inverting all data in the current data group and inserting a flag indicating that all data in the current data group are inverted when said compared polarities are the same; and means for injecting a DC offset in one of the first and second channels after encoding; and said receiving system means comprising:

a demodulator which demodulates the composite signal and removes the DC offset; and a decoder which inverts the demodulated data in accordance with the flag to obtain the original data before encoding by said transmission system.

2. A radio communication system according to claim 1, wherein the data of each channel to be transmitted is divided into frames having frame slots as the data groups, and said encoding means comprises means for inserting the flag into one of the frame slots of the inverted frame.

3. A radio communication system according to claim 2, wherein a service channel signal is inserted into said frame slot together with the flag, said service channel signal adjusting a maximum or minimum level of the flag.

4. A radio communication system for transmitting serial data from two channels, comprising:

a transmission system including:

data input means for converting the serial data into parallel data divided into data frames for each of the two channels;

flag frame creation means for creating a flag frame slot periodically between the data frames;

low frequency component suppression means for suppressing a low frequency component of the data frames, said low frequency component suppression means comprising:

means for determining a polarity of the current deviation of a current data frame;

means for determining a polarity of an average deviation of an average of prior data frames; and means for inverting the data in the data frame associated with the flag frame slot and inserting a flag in the flag frame slot when the polarity of the current deviation and the polarity of the average deviation are the same;

DC offset injection means for injecting a DC offset into one of the two channels; and transmission means for transmitting the data and flag frame slot; and a receiving system including:

receiving means for receiving the data and flag frame slot and removing the DC offset;

decoding means for inverting the data frame associated with the flag frame slot in dependence upon the flag; and data output means for converting the data frames into serial data.

5. A radio communication system according to claim 4, further including service channel insertion means for inserting service channel data into the flag frame slot.

6. A radio communicating system, comprising:

a quadrature amplitude modulation transmitter transmitting two channels of data carrying data groups and including:

transmitter inverting means for inverting a current data group producing an inverted data group when a polarity of a deviation of a cumulative value of all of the current data group is coincident with a polarity of a deviation of a cumulative value of all of a previous data group, and for otherwise passing therethrough the current data group as a non-inverted data group;

offset application means for applying a DC offset to a one of the two channels carrying the data groups; and transmitting means for transmitting the two channels including the inverted and the non-inverted data groups using a single carrier; and a quadrature amplitude modulation receiver receiving and demodulating the two channels including the inverted and the non-inverted data groups, and including:

offset removal and carrier regeneration means for removing a DC offset from the other one of the two channels and recovering the carrier;

demodulating means for demodulating and recovering the data groups using the carrier; and receiver inverting means for inverting the current data group when inverted by said transmitter inverting means.

7. A radio communication system as recited in claim 6, wherein said transmitter further comprises:

flag means for inserting an inversion indication flag signal as a symbol into the inverted data group; and service signal insertion means for inserting a service channel signal into the same symbol as the inversion indication flag signal; and wherein said receiver further comprises:

means for removing the inversion indication flag signal and the service channel from the inverted data group.

* * * * *